(12) United States Patent
Gotink-Meinders et al.

(10) Patent No.: US 7,760,296 B2
(45) Date of Patent: Jul. 20, 2010

(54) TRANSFLECTIVE DISPLAY HAVING IMPROVED CONTRAST

(75) Inventors: Nicole Alide Christianne Maria Gotink-Meinders, Heerlen (NL); Rudolf Jozef Marie Beeren, Heerlen (NL)

(73) Assignee: TPO Hong Kong Holding Limited, Shatin (HK)

( * ) Notice: Subject to any disclaimer, the term of this patent is extended or adjusted under 35 U.S.C. 154(b) by 731 days.

(21) Appl. No.: 10/571,835

(22) PCT Filed: Sep. 3, 2004

(86) PCT No.: PCT/IB2004/051684
§ 371 (c)(1),
(2), (4) Date: Mar. 15, 2006

(87) PCT Pub. No.: WO2005/021967
PCT Pub. Date: Mar. 31, 2005

(65) Prior Publication Data
US 2007/0115410 A1      May 24, 2007

(30) Foreign Application Priority Data
Sep. 19, 2003   (EP) .................................. 03103459

(51) Int. Cl.
*G02F 1/1335*    (2006.01)
(52) U.S. Cl. .................... 349/114; 349/113; 349/115; 349/61; 349/62; 349/63; 349/64; 349/65; 349/73; 349/74
(58) Field of Classification Search .......... 349/113–115, 349/61–65, 73–74
See application file for complete search history.

(56) References Cited

U.S. PATENT DOCUMENTS

| | | | | |
|---|---|---|---|---|
| 4,264,147 A * | 4/1981 | Baur et al. | ..................... | 349/70 |
| 6,124,971 A * | 9/2000 | Ouderkirk et al. | ........... | 359/487 |
| 6,262,842 B1 * | 7/2001 | Ouderkirk et al. | ........... | 359/487 |
| 6,285,422 B1 * | 9/2001 | Maeda et al. | ................. | 349/96 |
| 6,359,670 B1 * | 3/2002 | Broer et al. | ................. | 349/115 |
| 6,456,346 B1 * | 9/2002 | Arai | ........................... | 349/106 |
| 6,556,260 B1 * | 4/2003 | Itou et al. | ..................... | 349/69 |
| 6,628,357 B1 * | 9/2003 | Maeda et al. | ............... | 349/113 |
| 6,742,921 B2 * | 6/2004 | Umemoto et al. | ........... | 362/561 |
| 6,757,038 B2 * | 6/2004 | Itoh et al. | .................... | 349/113 |

(Continued)

OTHER PUBLICATIONS

PCT International Search Report of Counterpart PCT Application No. PCT/IB2004/051684.

*Primary Examiner*—Brian M. Healy
*Assistant Examiner*—Guy G Anderson
(74) *Attorney, Agent, or Firm*—Liu & Liu

(57) ABSTRACT

The present invention provides for improved contrast in the transmissive mode of a transflective liquid crystal display having a rear stack polarizing means (302) which is transmissive for light having a desired polarization and reflective for light having an opposite, undesired polarization. The contrast is improved due to enhancements of the black state provided by the inclusion of a reflection preventing means (306). The reflection preventing means is arranged between the transflector (301) and the rear stack polarizer (302), and serves to stop light transmitted through the rear stack polarizer (302) towards the transflector (301) from being reflected by the transflector (301) back to the rear polarizer (302). Thereby undesired reflections having wrong polarization are stopped from being transmitted through the transflector (301) and thus from affecting the transmissive mode black state of the display.

20 Claims, 3 Drawing Sheets

U.S. PATENT DOCUMENTS

| | | | |
|---|---|---|---|
| 6,768,481 B2 * | 7/2004 | Ozawa et al. | 345/87 |
| 6,831,711 B2 * | 12/2004 | Choi et al. | 349/74 |
| 6,839,105 B2 * | 1/2005 | Tanaka et al. | 349/110 |
| 6,933,992 B2 * | 8/2005 | Maeda et al. | 349/96 |
| 6,937,303 B2 * | 8/2005 | Jang et al. | 349/114 |
| 7,173,679 B2 * | 2/2007 | Doornkamp | 349/114 |
| 2001/0020990 A1 | 9/2001 | Moon | |
| 2001/0050738 A1 * | 12/2001 | Miller | 349/113 |
| 2002/0003596 A1 | 1/2002 | Kim | |
| 2002/0145689 A1 | 10/2002 | Kaneko | |
| 2003/0086038 A1 | 5/2003 | Okumura | |
| 2004/0080688 A1 * | 4/2004 | Ishida | 349/113 |
| 2006/0262255 A1 * | 11/2006 | Wang et al. | 349/114 |
| 2008/0088776 A1 * | 4/2008 | Ishigaki et al. | 349/114 |

* cited by examiner

TRANSFLECTIVE DISPLAY HAVING IMPROVED CONTRAST

FIELD OF THE INVENTION

The present invention relates to a liquid crystal display device, and more specifically to a transflective liquid crystal display device having improved contrast.

TECHNOLOGICAL BACKGROUND

Transflective liquid crystal displays, such as super twisted nematic liquid crystal displays (STN-LCD), active matrix liquid crystal displays (AM-LCD), and color super twisted nematic liquid crystal displays (CSTN-LCD), are commonly used in mobile handheld applications. Such display devices are preferred due to their comparatively low power consumption and their good front-of-screen performance. A transflective liquid crystal display is characterized by its ability to function in a reflective mode enabling reflection of ambient light, as well as in a transmissive mode enabling transmission of light from an auxiliary light source (for example a backlight). Devices provided with such transflective displays therefore provide acceptable readability in bright as well as dark conditions.

The fundamental principles of transflective displays are well known, for example from the UK patent application 2 101 347. A transflective liquid crystal display thus comprises a display cell having a front substrate and a rear substrate, between which a layer of liquid crystal material is sandwiched. A front polarizer, or analyzer, and a compensation film are sandwiched in front of the display cell. Furthermore, an optical rear stack comprising a transflector, a quarter-wave retarder element, a linearly polarizing element, and a light source (e.g. a backlight) is sandwiched behind the rear substrate in said order.

When operating in the reflective mode and when the cell is inactivated, i.e. when the circuit between the front and rear electrodes is open, ambient light entering the front substrate will be absorbed by the aligned liquid crystal layer. A viewer thus perceives the display cell as being dark. On the other hand, when the cell is activated (i.e. when the liquid crystal layer is exposed for an electric field), the directors in the liquid crystal are essentially perpendicular to the front and rear substrates, allowing a substantial part of the ambient light entering the front substrate to pass through the cell, reflect at the transflector and return towards a viewer. The viewer then perceives the display as being bright.

However, when the ambient light is insufficient for the display to emit a readable picture the light source is turned on and the transmissive mode is activated. When the transmissive mode is active, randomly polarized light emitted from the light source is circularly polarized in the optical rear stack and transmitted through the transflector. In case the liquid crystal cell is inactivated, the circularly polarized light impinging thereon from the light source will however be absorbed in the aligned liquid crystal. The liquid crystal thus functions as a closed light valve, and the inactive cell is perceived as dark. For the effect to occur, i.e. for the light valve to close, it is essential for the light to be accurately polarized, otherwise the light will pass through the cell and disturb the dark state. On the other hand, when the cell is activated and the liquid crystal molecules are perpendicular to the substrates, a substantial part of the light transmitted through the transflector will exit the cell towards the viewer, giving the display a bright appearance.

The function of the optical rear stack in a transflective liquid crystal display is thus to transform incident, randomly polarized light from the backlight into pure circularly polarized light. The light should be either left hand or right hand circularly polarized, depending on the alignment in the liquid crystal cell. Conventionally, this transformation has been achieved using a linear polarizer and a quarter-wave retarder as described above. However, transforming non-polarized light to circularly polarized light using a linear polarizer and a retarder, results in a relatively low transmission ratio since the linear polarizer absorbs any light emitted from the backlight that has wrong polarization direction.

To this end, a solution has been suggested to improve the previous transmission rates substantially. According to that solution, the circular polarization is provided by means of a planar twisted nematic polymer layer (TN-layer) having a short pitch and replacing the rear polarizer and quarter-wave retarder. Having a short enough pitch, the TN-layer reflects one half of the light emitted by the backlight and transmits the other half of the light emitted by the backlight. The transmitted light, as well as the reflected light, is circularly polarized. In particular, if the sense of rotation of the twisted layer is right (left), the reflected light is right handed (left handed) circularly polarized and the transmitted light is left handed (right handed) circularly polarized. In effect, the left and right circularly polarized light parts of the randomly polarized light is separated by the TN polymer layer, one part being transmitted and the other part being reflected.

An advantage replacing the linear polarizer/retarder arrangement with a TN polymer layer is therefore that light impinging the polarizer from the backlight is either transmitted (the part of the light that happens to have the correct polarization) and constructively used in the display, or reflected back towards the backlight where it can be recycled. This is opposed to the linear polarizer/retarder arrangement, where the non-transmitted light is absorbed and thus wasted by the linear polarizer. Consequently, replacing the quarter-wave retarder and the linear polarizer in the rear optical stack by a twisted nematic polymer layer provides substantially increased transmission ratios.

However, even though the design using a TN polymer layer indeed provides improved optical properties, there are some drawbacks associated with the replacement of the rear polarizer and the quarter-wave retarder by a twisted nematic polymer layer. One such drawback is poor contrast in the dark state of the transmissive mode.

To this end, the present invention provides a transflective liquid crystal display utilizing a twisted nematic polymer layer and having improved contrast in the dark state. The present invention is based on the recognition that a major part of the light that is emitted from the backlight through the TN polymer layer and reflected by the transflector is reflected again by the twisted nematic polymer layer due to polarization reversion upon reflection at the transflector. That is, the polarization of the light that is reflected at the transflector is reversed upon reflection. The returning light thus impinges the twisted nematic layer with opposite polarization and therefore experiences total reflection back towards the transflector. As a consequence, light having reversed polarization direction is transmitted through the transflector towards the liquid crystal cell causing degradation of the black state and decreased contrast. The inventors have furthermore realized that this black state degrading effect can be substantially eliminated by effectively preventing light reflections at the rear side of the transflector, whereby improved contrast in the dark state of the transmissive mode is achieved.

Polarizers based on twisted nematic polymer layers are thus characterized by their ability to transmit light having one particular polarization and reflect light having the opposite polarization. For the purpose of this invention, polarizers having such properties are more generally denoted reflective polarizers. The above-described linear polarizer, that absorbs the light that has wrong polarization, is in the same manner more generally denoted absorbing polarizers.

Thus, according to one aspect of the invention, a transflective liquid crystal display device comprising: a liquid crystal layer, a transflector, a reflecting polarizer, and a backlight, sandwiched in said order is provided. The backlight is operative to emit light towards said transflector, and the transflector is transmissive for a first part of said light and non-transmissive for a second part of said light. The display device further comprises reflection preventing means arranged between said transflector and said twisted nematic polymer layer and being operative to prevent said second part of light from propagating back towards the twisted nematic polymer layer.

The inclusion of a reflection preventing means thus prevents light having reversed polarization direction from being transmitted through the transflector towards the crystal display cell. Thereby degradation of the black state is avoided and the display contrast in transmissive mode is improved. Of course, the reflective mode performance of the display is not affected since the reflection preventing means is arranged on the rear side of the transflector.

The reflection preventing means thus serves to prevent light from returning back to the TN polymer layer. The reflection preventing means could be arranged as a black surface, absorbing reflected light and/or preventing reflections from ever occurring.

Any type of transflector can be used, the important characteristic is that it is able to reflect ambient light and transmit light from a backlight arrangement. As long as such some of the light from the backlight is reflected back towards the TN polymer layer with a reversed polarization, the present invention will provide an improved black state in the transmissive mode of the display.

However, an important issue for the proper functionality is the ability to separate the light that is to be transmitted through the transflector from the rest of the light, since the first is to be unaffected and the second is to be eliminated. Therefore the hole-in-mirror type transflector is suggested, providing well-defined transmission areas and non-transmission areas.

Therefore, the invention is particularly applicable to transflective displays that have a hole-in-mirror type transflector. For the purpose of this invention, a hole-in-mirror type transflector is a transflector having transmissive portions and non-transmissive portions. Some light impinging the transflector will thus be transmitted through the transmissive portions and some light will be stopped by the non-transmissive portions. The most basic example is a mirror having holes arranged in it. The holes could for example consist of distributed perforations or slits. For example, the area of a hole-in-mirror type transflector having a transmission/reflection ratio of 10/90 typically consists on 10% holes and 90% non-transmissive material (conventionally some reflecting material). Of course, the holes in a hole-in-mirror type transflector need not be actual holes, the transflector could alternatively comprise one transmissive area and one non-transmissive are, separated from each other.

The reflection preventing means could have any design, as long as it is able to absorb non-transmitted light without stopping the light that is to be transmitted through the transflector. Thus, the reflection preventing means does not actually have to prevent reflections as such, but could alternatively be arranged to absorb reflected light. Furthermore, the reflection preventing means can be arranged in several different ways. For instance, the reflection preventing means could be comprised of light absorbing layers (so-called black masks) or an anti reflection coating that typically consisting of a stack of several thin layers.

In case the transflector is arranged on the front side of the rear substrate, an additional black, absorbing layer can be inserted between the rear substrate and the transflector. In such case the transflector and the absorbing layer preferably have corresponding patterns of transmissive and non-transmissive areas.

The black layer can advantageously be etched in the same pattern as the hole-in-mirror type transflector.

Alternatively, light absorption could be achieved using a stack of light reflecting and light absorbing layers. These layers are preferably etched all in the same manufacturing process step.

According to one embodiment, the stack of reflecting and absorbing layers comprises at least one light reflecting layer formed in Cr and at least one light absorbing layer formed in $CrO_x$.

Another alternative is to print or place a patterned black layer between the rear substrate and the twisted nematic polymer layer.

As is readily understood, the reflection preventing means can be arranged in many different ways, using existing manufacturing equipment and without substantially altering the general design of conventional displays. The approach chosen for any particular implementation is expected to depend upon existing manufacturing capabilities, desired stack layout etc.

According to one embodiment, the liquid crystal is of a twisted nematic (TN) type, a super twisted nematic (STN) type or a non-twisted nematic type.

Hereinafter, embodiments of the transflective liquid crystal display device according to the present invention will be described in detail with reference to the accompanying, exemplifying figures, in which.

Figure 4:
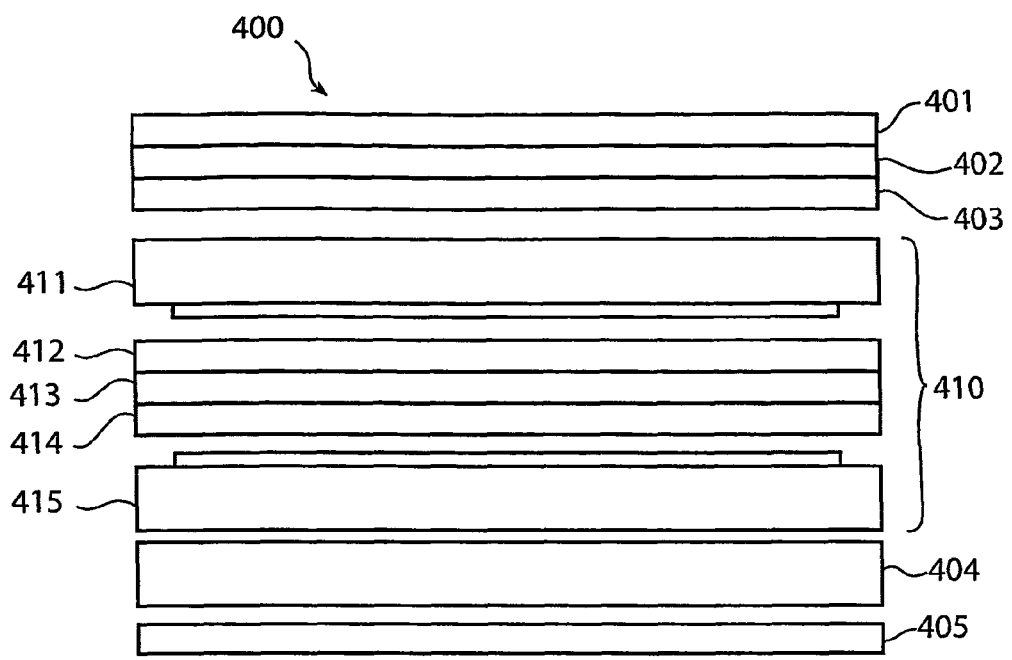
Figure 5:
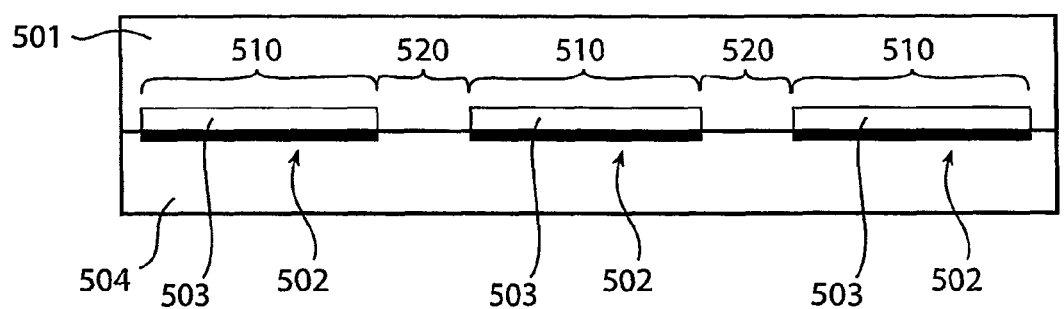
Figure 6:
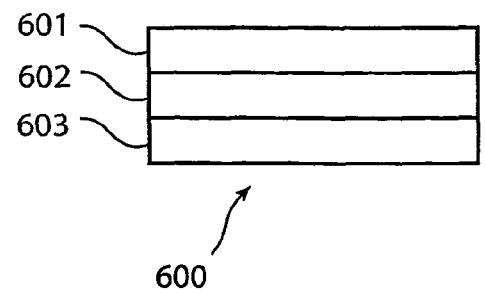

FIG. 4 schematically shows an embodiment of the transflective liquid crystal display according to the present invention;

FIG. 5 shows one approach for providing reflection preventing means involving incorporation of a black absorbing layer; and FIG. 6 shows another approach for providing reflection preventing means involving the provision of a stack of reflecting layers and absorbing layers underneath the transflector.

Figure 1:
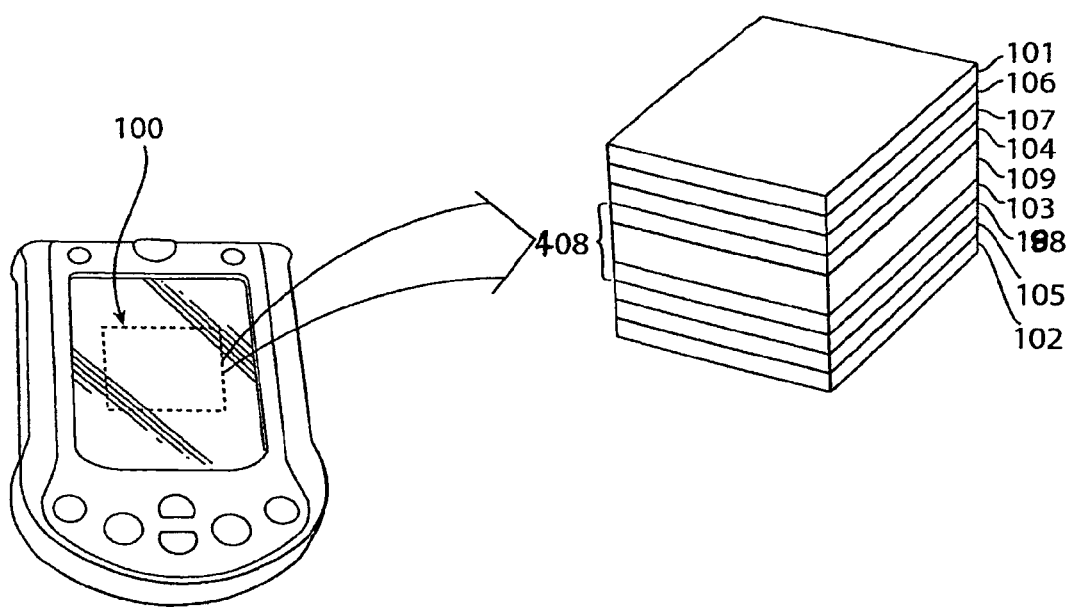
FIG. 1 shows an example of a handheld mobile unit comprising a transflective liquid crystal display unit, and an enlarged cross section of such a display according to prior art.

First, a more detailed description of the prior art will be provided in order to provide a better understanding of the present invention. Thus, referring to FIG. 1, a handheld device comprising a transflective liquid crystal display device 100 is shown as well as an enlarged cross section of the transflective liquid crystal display unit. The display unit comprises a liquid crystal cell 408 comprising a front substrate 104 and a rear substrate 103, formed of glass or the like, and a liquid crystal layer 109 sandwiched therebetween. On the front surface of the front substrate, a front scattering layer 107, a front compensation layer 106 and an analyzer 101 are arranged. On the backside of the rear substrate a transflector 108 is arranged and patterned so that a transmissive part and a reflective part is formed. Furthermore, a twisted nematic polymer layer 105 and a backlight 102 are sandwiched in said order.

Figure 2:
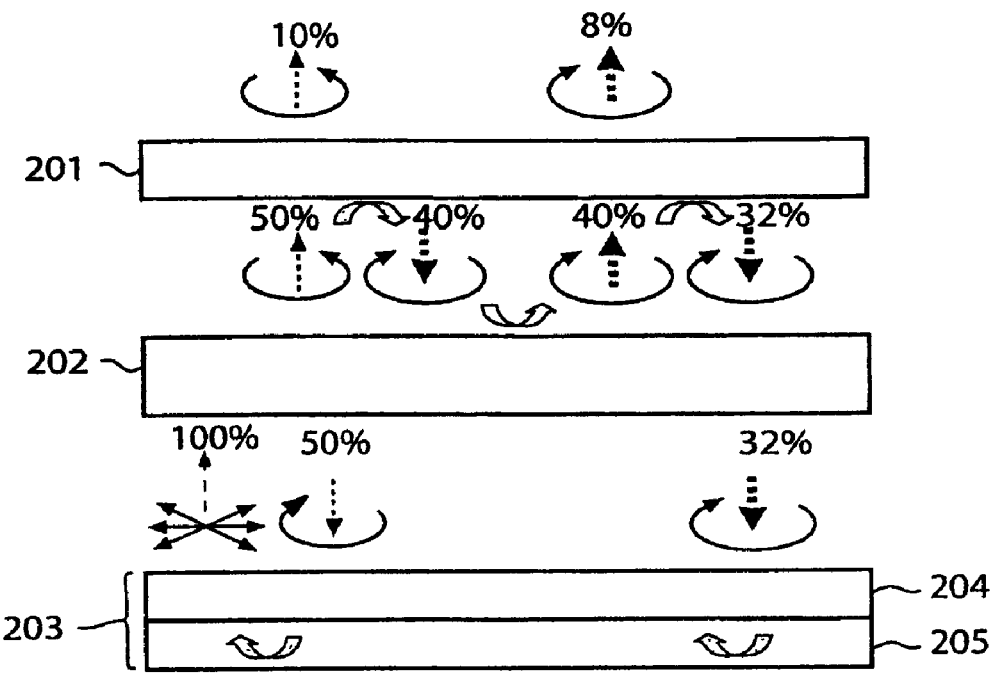
FIG. 2 illustrates light propagating in the transmissive mode of a transflective liquid crystal display unit having a twisted nematic polymer layer.

FIG. 2 schematically illustrates light from the backlight propagating in a rear stack of a prior art transflective device. The rear stack comprises a backlight 203, comprising a light guide 205 and diffusor 204, a rear polarizer, e.g., a twisted nematic (TN) polymer layer 202, and a transflector 201. For illustration, the light that is emitted from the backlight is denoted 100%. This light is randomly polarized, and thus 50% is reflected back towards the backlight (where it can be recycled) and 50% is transmitted through the TN layer 202. For this particular example, the transflector has a transmission/reflection ratio of 20/80, i.e. 20% of incident light is transmitted and 80% of incident light is reflected. Due to the 20/80 ratio, 10% (20% out of 50%) is transmitted through the transflector 201 and 40% (80% out of 50%) is reflected back towards the TN layer 202. As indicated by the arrows, the circular polarization of the reflected light is reversed. Therefore, all 40% of the reflected light is reflected back again by the TN layer 202 towards the transflector 201. This time 8% (20% out of 40%) of light having wrong polarization is transmitted through the transflector 201 and 32% is reflected back towards the TN layer 202. However, the circular polarization is reversed and the therefore all 32% of light is transmitted through the TN layer 202 towards the backlight 203. Thus, two parts of light having opposite polarization directions are transmitted through the transflector resulting in the before mentioned degradation of the black state and therefore decreased contrast in the display device. For this particular example 10% is transmitted with correct polarization and 8% is transmitted with wrong polarization.

Figure 3:
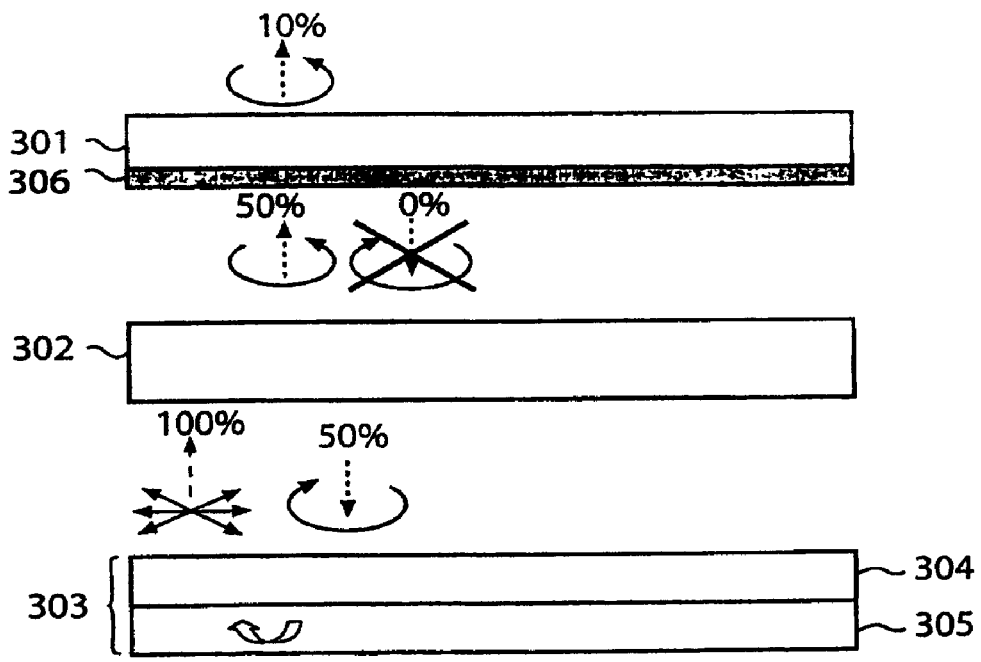
FIG. 3 illustrates light propagating in an inventive transflective display operating in transmissive mode.

In order to eliminate the above problem, an inventive approach as illustrated in FIG. 3 is suggested. Similar to prior art, the invention comprises a light source 303, composed of a diffusor 304 and a light guide 305, a TN polymer layer 302 and a 20/80 transflector 301. However, a light absorbing layer 306 is arranged between the transflector 301 and the TN layer 302. In analogy with the above description related to FIG. 3, the light that is emitted from the backlight is denoted 100%, and 50% of this light is reflected by the TN layer 302 back towards the backlight 303 where it can be recycled in the light guide 305. The remaining 50% that is transmitted through the TN layer 203 travels towards the transflector 301. Since the transflector has a transmission/reflection ratio of 20/80, 10% (20% out of 50%) of light is transmitted through it. However, the light absorbing layer 306 absorbs the remaining light so that no light is reflected back towards the TN layer 302. Thereby any destructive reflections are prevented.

A transflective liquid crystal display device 400 according to a first embodiment of the present invention will now be described, referring to FIG. 4. The liquid crystal display device 400 comprises a liquid crystal cell 410 comprising a front substrate 411 and a rear substrate 415, e.g. formed out of glass or the like, and a liquid crystal layer 412 sandwiched between the front and rear substrates 411, 415. A light scattering layer 403, a compensation layer 402, and a polarizer 401 are sandwiched on top of the front substrate 411 in said order. A transflector 413 is sandwiched on top of the rear substrate 415, and a twisted nematic polymer layer 404 and a backlight arrangement 405 are arranged underneath the back substrate 415.

Moreover, according to this embodiment, a reflection preventing means in the form of light absorbing layer 414 is applied between the transflector 413 and the rear substrate 415. The reflection preventing means could however be placed anywhere between the transflector and the TN polymer layer. The reflection preventing means may be a stack of multiple layers, as shown in the embodiment of FIG. 6, and discussed below.

The reflection preventing means could for example be provided by means of printing or as a separate, selectively etched layer.

According to one embodiment, illustrated in FIG. 5, the transflector 503 is arranged between the rear substrate 501 and the TN layer 504, and the reflection preventing means is arranged as an additional black layer 502 between the transflector 503 and the TN layer 504. The transflector layer 503 could, for example, be formed out of Cr and the light absorbing layer could, for example, be formed out of $Cr_xO_x$ (Chromium Oxide). The black layer 502 could preferably be etched in the same process as the transflector, in order to simplify the manufacturing process. In this particular figure, the layout of the transflector is shown in greater detail, comprising areas 510 non-transmissive for light and areas 520 transmissive to light. This is a typical hole-in-mirror layout.

According to another embodiment, illustrated in FIG. 6, the reflection preventing means 600 comprises a stack of antireflection layers 601, 602, 603. Antireflection layers are well known in the art, and any available anti-reflecting material could be used. The stack could be arranged directly on, or separated from, the transflector.

It should be noted that the above described embodiments of the present invention are not to be construed as limiting the invention, but are rather given as examples of how the present invention may be utilized. A man skilled in the art will be able to design many alternative embodiments of this invention, without departing from the spirit and scope of this invention, as defined in the appended claims.

In essence, the present invention provides for improved contrast in the transmissive mode of a transflective liquid crystal display having a rear stack polarizing means 302 which is transmissive for light having a desired polarization and reflective for light having an opposite, undesired polarization. The contrast is improved due to enhancements of the black state provided by the inclusion of a reflection preventing means 306. The reflection preventing means is arranged between the transflector 301 and the rear stack polarizer 302, and serves to stop light transmitted through the rear stack polarizer 302 towards the transflector 301 from being reflected by the transflector 301 back to the rear polarizer 302. Thereby undesired reflections having wrong polarization are stopped from being transmitted through the transflector 301 and thus from affecting the transmissive mode black state of the display.

The invention claimed is:

1. A transflective liquid crystal display device comprising: a front substrate, a liquid crystal layer, a transflector, a rear substrate, rear polarizing means, and a backlight, sandwiched in said order, wherein the front substrate and rear substrate form a liquid crystal cell having the liquid crystal layer therebetween; said backlight being operative to emit light towards said transflector; said transflector being transmissive for a first part of said light and non-transmissive for a second part of said light; and said rear polarizing means being operative to transmit light having a first polarization and to reflect light having a second polarization, opposite to said first polarization; wherein said display device further comprising reflection preventing means arranged between said transflector and said rear polarizing means, and arranged between the front substrate and the rear substrate within the liquid crystal cell; said reflection preventing means being operative to prevent said second part of light from propagating back towards said rear polarizing means.

2. A transflective liquid crystal display according to claim 1, wherein said rear polarizing means is a twisted nematic polymer layer.

3. A transflective liquid crystal display according to claim 1, wherein said transflector is a hole-in-mirror type of transflector and thus comprises an area that is transmissive for light and an area that is non-transmissive for light.

4. A transflective liquid crystal display according to claim 1, wherein said reflection preventing means comprises a light absorbing layer.

5. A transflective liquid crystal display according to claim 4, wherein said black, light absorbing layer (414) comprises chromium oxide.

6. A transflective liquid crystal display according to claim 4, wherein said transflector and said light absorbing layer has a corresponding pattern of areas transmissive and non-transmissive for light.

7. A transflective liquid crystal display according to claim 1, wherein said reflection preventing means (414) comprises a stack of antireflection layers.

8. A transflective liquid crystal display according to claim 1, wherein said liquid crystal is of the twisted nematic type, a super twisted nematic type or a non-twisted nematic type.

9. A transflective liquid crystal display device comprising:
a front substrate;
a liquid crystal layer,
a transflector, a reflection preventing layer, a rear substrate, a rear polarizer, and a backlight, sandwiched in said order on a same side of the liquid crystal layer, wherein the front substrate and rear substrate form a liquid crystal cell having the liquid crystal layer therebetween;
wherein said backlight being operative to emit light towards said transflector, said transflector being transmissive to a first part of said light and non-transmissive to a second part of said light, and wherein the reflection preventing layer being operative to prevent said second part of light from propagating back towards said rear polarizing means, and wherein the reflection preventing layer is arranged between the front and rear substrates within the liquid crystal cell.

10. A transflective liquid crystal display according to claim 1, wherein said rear polarizer being operative to transmit light having a first polarization and to reflect light having a second polarization different from said first polarization.

11. A transflector liquid crystal display according to claim 10, wherein said rear polarizer comprises a twisted nematic polymer layer.

12. A transflective liquid crystal display according to claim 1, wherein the first part of light transmissive through the transflector has a third polarization, and the second part of light not transmissive through the transflector has a fourth polarization.

13. A transflective liquid crystal display according to claim 12, wherein said transflector comprises a first area that is transmissive to light and a second area that is non-transmissive to light.

14. A transflective liquid crystal display according to claim 13, wherein the second area is reflective, reflecting the second part of light.

15. A transflective liquid crystal display according to claim 14, wherein the second part of light reflected from said transflector is blocked by the reflection preventing layer.

16. A transflective liquid crystal display according to claim 12, wherein said reflection preventing layer comprises a light blocking layer operative to transmit light having the third polarization, and to block light having the fourth polarization.

17. A transflective liquid crystal display according to claim 16, wherein said light blocking layer comprises a light absorbing layer operative to absorb light having the fourth polarization.

18. A transflective liquid crystal display according to claim 17, wherein said light absorbing layer comprises chromium oxide.

19. A transflective liquid crystal display according to claim 16, wherein said transflector has a pattern of first areas and second areas, and said light blocking layer has a corresponding pattern.

20. A transflective liquid crystal display according to claim 9, wherein said reflection preventing layer comprises a stack of antireflection layers.

* * * * *